Figure 5:
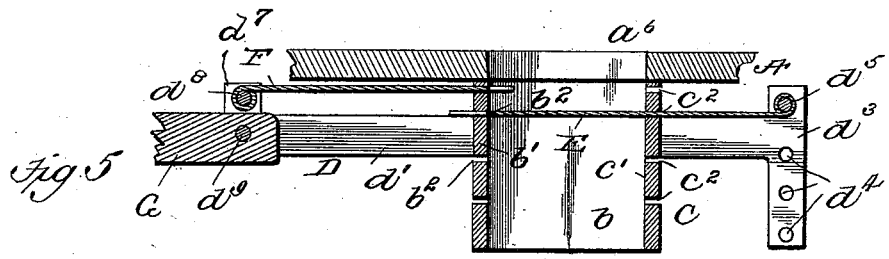

(No Model.) 4 Sheets—Sheet 1.
R. W. JONES.
COMBINED CORN PLANTER AND FERTILIZER DISTRIBUTER.
No. 555,044. Patented Feb. 18, 1896.
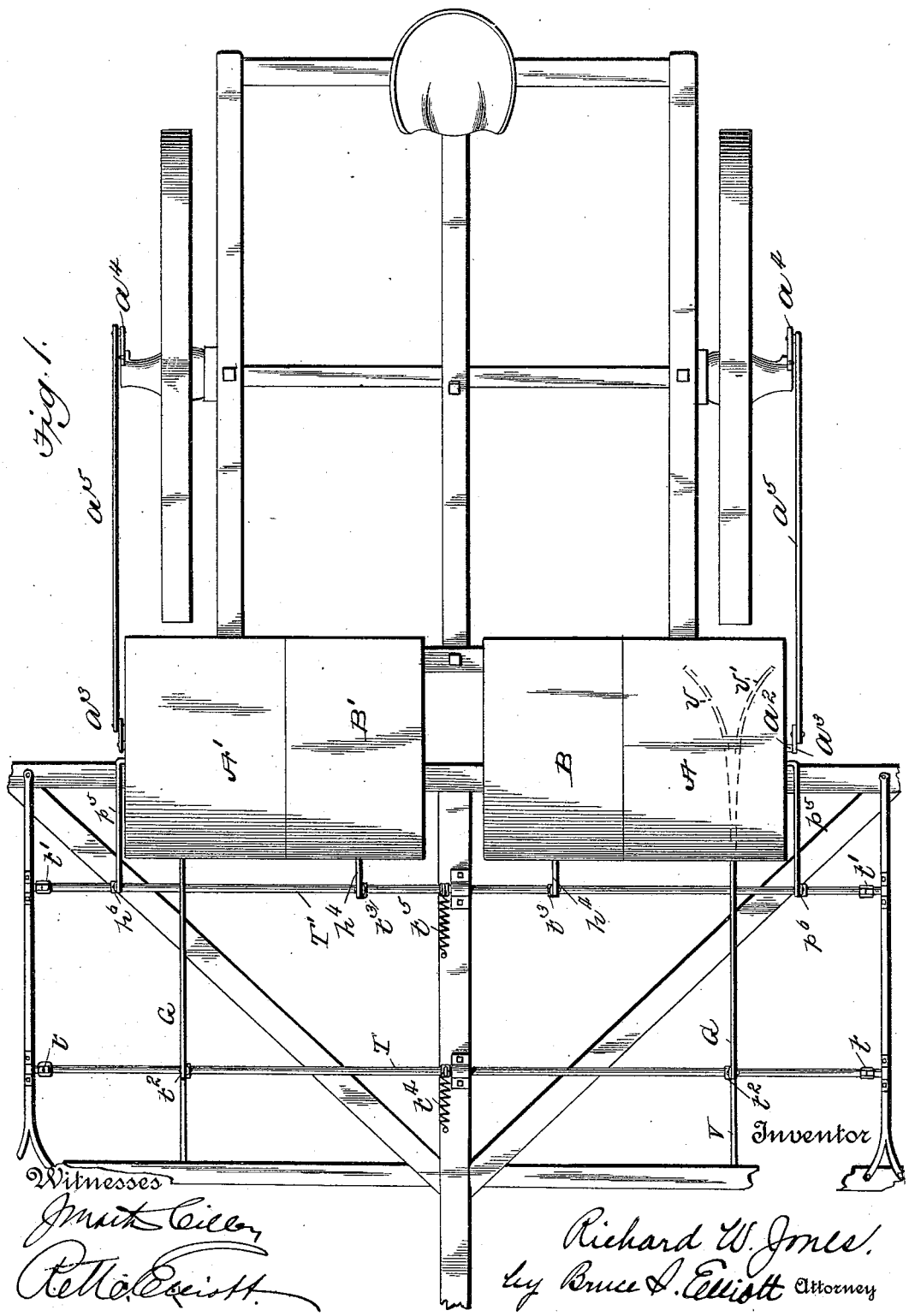

(No Model.) 4 Sheets—Sheet 2.
R. W. JONES.
COMBINED CORN PLANTER AND FERTILIZER DISTRIBUTER.
No. 555,044. Patented Feb. 18, 1896.
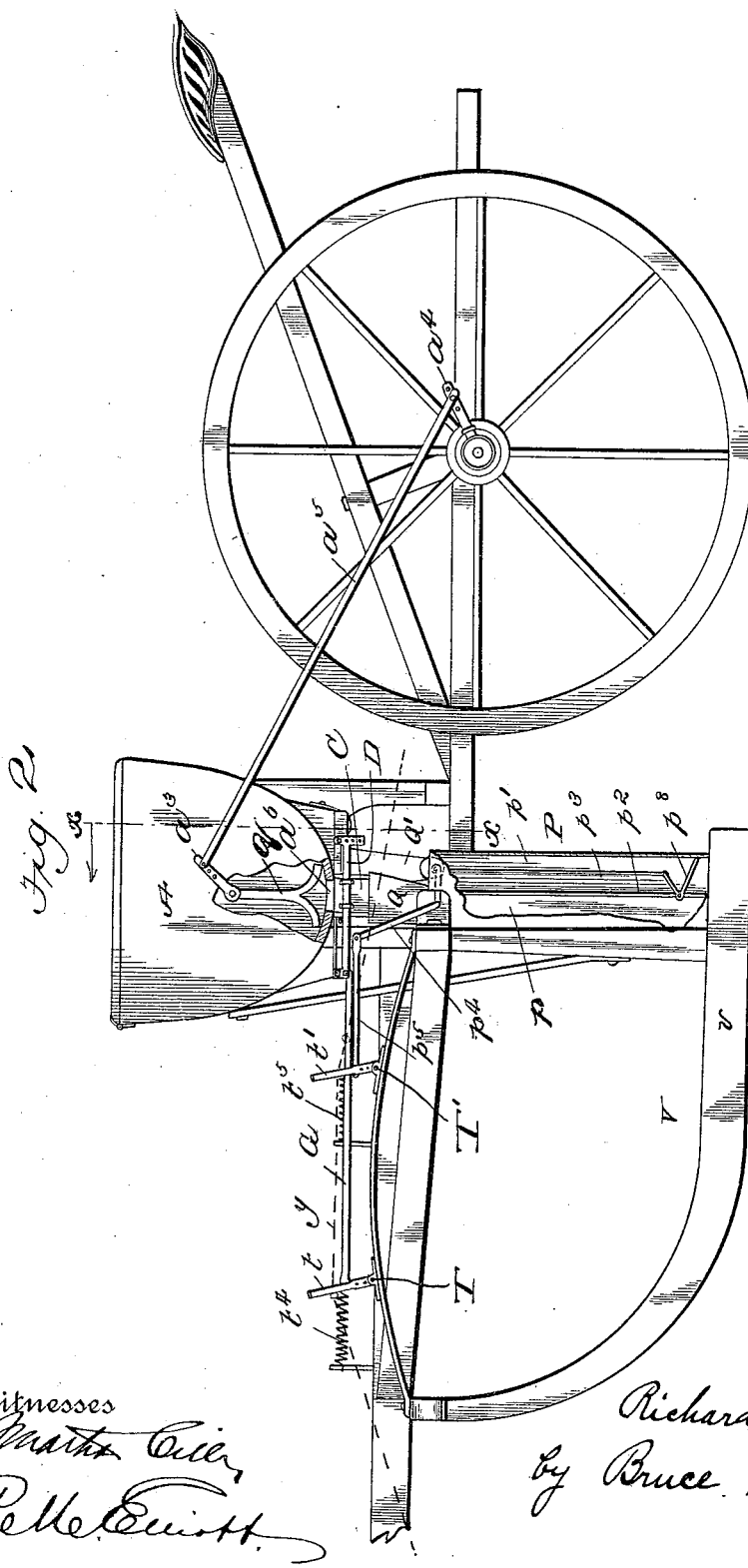

(No Model.)
R. W. JONES.
COMBINED CORN PLANTER AND FERTILIZER DISTRIBUTER.
No. 555,044. Patented Feb. 18, 1896.
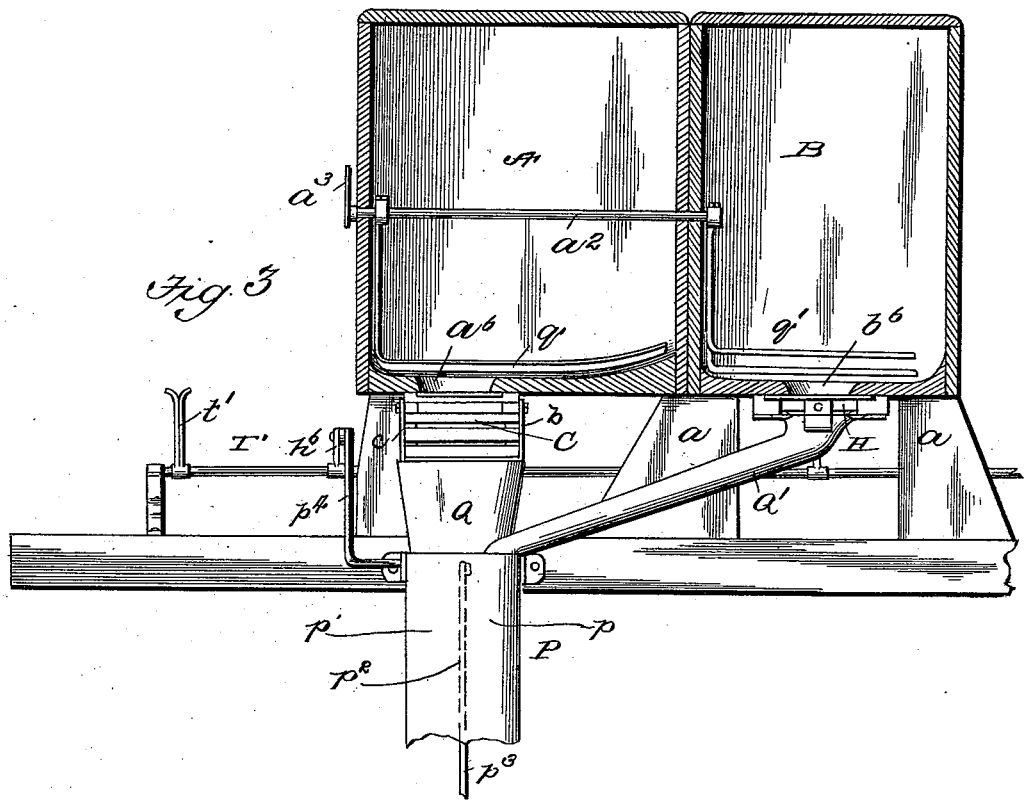
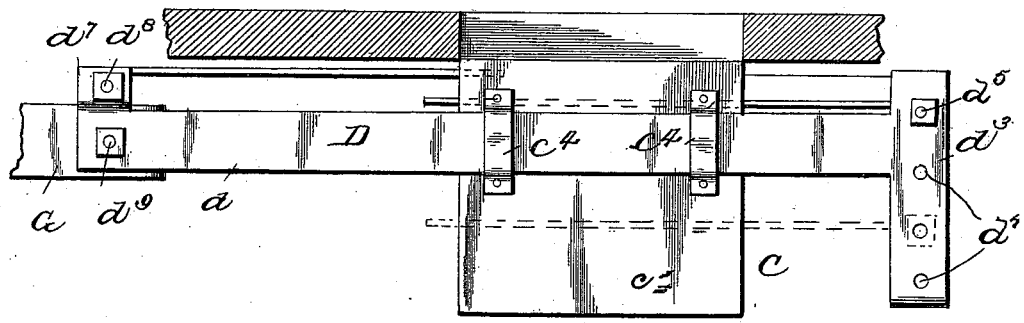
Witnesses
Inventor:
Richard W. Jones,
by Bruce S. Elliott.
his Attorney.
ANDREW B GRAHAM, PHOTO-LITHO, WASHINGTON, D.C.

(No Model.) 4 Sheets—Sheet 4.
R. W. JONES.
COMBINED CORN PLANTER AND FERTILIZER DISTRIBUTER.
No. 555,044. Patented Feb. 18, 1896.

Witnesses
Inventor:
Richard W. Jones
by Bruce S. Elliott, Attorney.

UNITED STATES PATENT OFFICE.

RICHARD W. JONES, OF ROCK HALL, ASSIGNOR OF ONE-HALF TO SAMUEL BECK, OF CHESTERTOWN, MARYLAND.

COMBINED CORN-PLANTER AND FERTILIZER-DISTRIBUTER.

SPECIFICATION forming part of Letters Patent No. 555,044, dated February 18, 1896.

Application filed December 26, 1894. Serial No. 532,925. (No model.)

*To all whom it may concern:*

Be it known that I, RICHARD W. JONES, a citizen of the United States, residing at Rock Hall, in the county of Kent and State of Maryland, have invented certain new and useful Improvements in a Combined Corn-Planter and Fertilizer-Distributer; and I do hereby declare the following to be a full, clear, and exact description of the invention, such as will enable others skilled in the art to which it appertains to make and use the same.

My invention relates to a combined corn-dropper and fertilizer-distributer capable in practice of being applied to any of the well-known planters now in use. Hence the construction of the machine proper forms no part of my invention.

The main object of my invention is to insure the dropping of the fertilizer in any desired quantity at regular intervals and to prevent any waste thereof.

A further important object is to secure the certain dropping of the desired number of grains of corn coincident with the fall of the fertilizer.

Further objects of the invention relate to the construction of the corn and fertilizer dropping apparatus and the mechanism to operate the same, whereby the dropping of the corn and fertilizer together, and in approximately the same spot, is assured, irrespective of the speed of the machine, all clogging of the parts prevented, and a certainty of operation obtained, insuring more satisfactory results and a less amount of waste than are possible with any other machine of which I am aware.

With the above objects in view my invention consists in an adjustable cut-off and measurer for the fertilizer.

My invention further consists in an improved slidable cut-off and corn-dropper.

My invention further consists in the construction of the spout for delivering the corn and fertilizer to the ground simultaneously, but adapted to keep them separated while in the spout.

My invention further consists in certain details of construction and operation of parts, all as hereinafter more fully described and pointed out in the claims.

Figure 6:
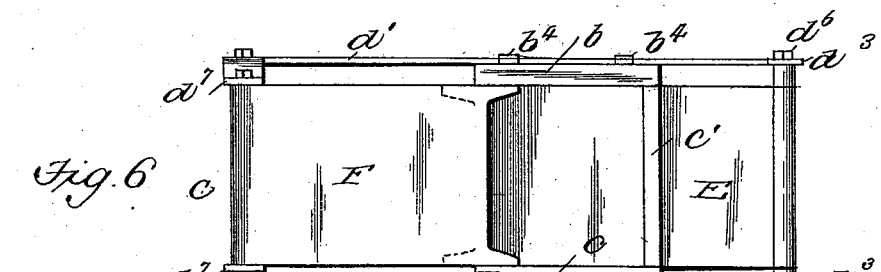
Figure 7:
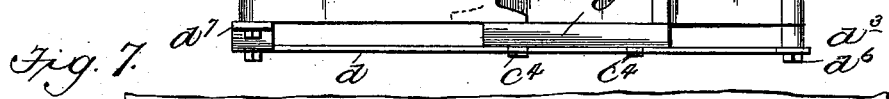
Figure 8:
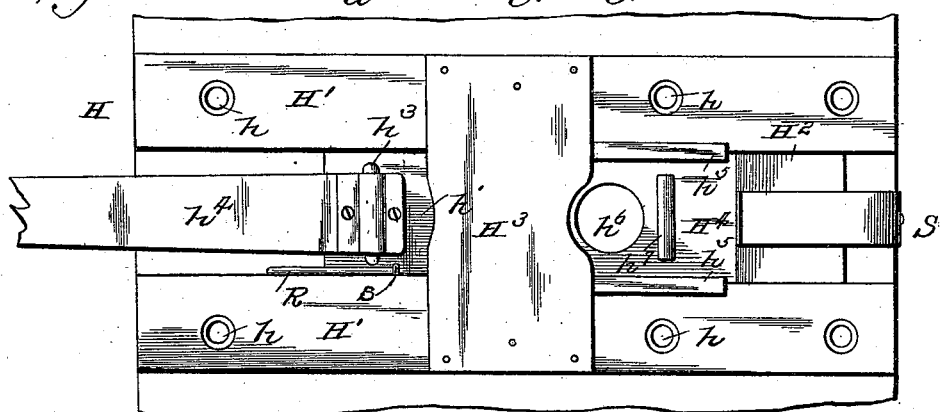
Figure 9:
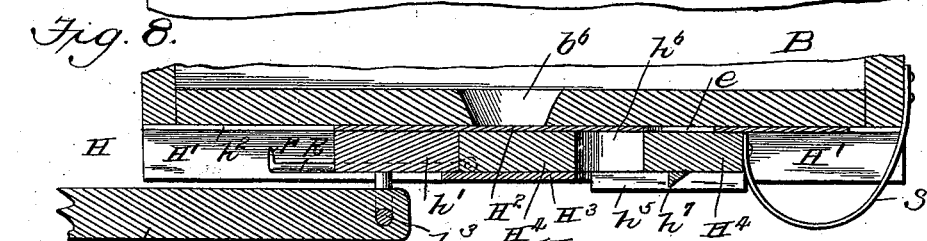
Figure 10:
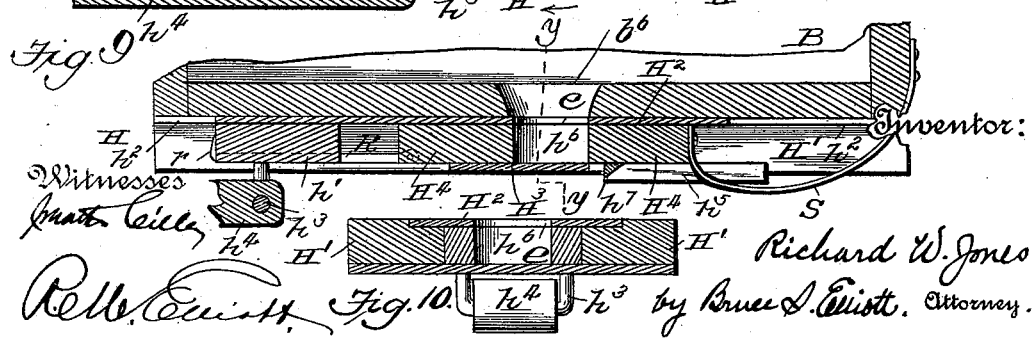

In the accompanying drawings, in which like letters of reference indicate corresponding parts throughout the several views, Figure 1 is a top plan view of a machine embodying my invention; Fig. 2, a side elevation of the same, partly broken away to show certain parts of the mechanism; Fig. 3, a vertical sectional view on the line $x\,x$ of Fig. 2 and viewed in the direction of the arrow or from the rear and showing one set of hoppers; Fig. 4, a side elevation of the combined fertilizer measurer and cut-off; Fig. 5, a vertical longitudinal sectional view of the same; Fig. 6, a plan view of the same; Fig. 7, a bottom plan view of the corn-dropping mechanism; Fig. 8, a vertical sectional view thereof, showing the parts in a position to drop the corn; Fig. 9, a like view with the parts in position to receive the corn from the hopper, and Fig. 10 a sectional view on the line $y\,y$ of Fig. 9 and viewed in the direction of the arrow.

The body or frame of the machine is of the usual or any preferred construction and need not be more particularly described.

Supported on the frame of the machine by suitable standards $a$ are the fertilizer-hoppers A A' and the corn-hoppers B B', a corn-hopper and fertilizer-hopper being located on each side of the machine, as shown, and in close proximity to each other.

In Fig. 3 I have shown a sectional view of one set of hoppers A B, to which the description will be limited, the other set, A' B', being similar thereto in all respects. Within these hoppers are agitators $q\,q'$, respectively, which are fastened on a rod $a^2$. On the outer end of this rod is a crank-arm $a^3$, and on the hub of the wheel of the machine a similar arm $a^4$, the said arms being connected by a rod $a^5$. In the forward movement of the machine the revolution of the wheels will cause the agitators to be rocked to and fro, as will be readily understood.

In the bottom of the hopper A, and located near its outer side, is an opening $a^6$, through which the fertilizer passes, and immediately beneath this opening, and secured to the bottom of the hopper in any suitable manner, is the cut-off and measurer C for the fertilizer, which is best shown in Figs. 4, 5 and 6. This cut-off and measurer comprises a frame, generally rectangular in shape, consisting of side pieces, $b\ c$, which are solid, and end pieces, $b'\ c'$, having, respectively, lateral slits or openings $b^2\ c^2$. On the outer side pieces, $b\ c$, are secured bails $b^4\ b^4\ c^4\ c^4$, respectively, which serve as guides for the arms $d\ d'$ of a slidable yoke D. At their rear ends the arms $d\ d'$ are each provided with a lug $d^3$, which extends at a right angle thereto, and each lug $d^3$ is provided with a number of bolt-holes $d^4$, adapted to receive a bolt $d^5$, which is secured in place by nuts $d^6$. The openings $b^2\ c^2$ in the ends $b'\ c'$ are in alignment with each other, and through them slides a plate E, guided by grooves (not shown) in the inner faces of the sides $b\ c$, one end of which is secured to the bolt $d^5$. The purpose of the plate E is to receive the fertilizer as it falls from the hopper. At their forward ends the arms $d\ d'$ are each provided with an upward-extending lug $d^7$, having bolt-holes therein, which are in alignment with each other. Through the two upper holes passes a bolt $d^8$, secured at its ends by suitable nuts, and secured on said bolt is a plate F, termed herein a "cut-off" plate, which is adapted to slide in grooves formed in the upper edges of the sides $b\ c$ and above the plate E. The arrangement of the plates E and F is such that as the plate E is entering the frame C the plate F will be leaving it, and vice versa. A second bolt, $d^9$, passes through the lower set of holes in the lug and serves to retain between the two ends of the arms $d\ d'$ one end of a bar G, which is operated by suitable mechanism, hereinafter described, to reciprocate the yoke D.

In the bottom of the hopper B is an opening $b^6$, through which the corn falls, and immediately beneath this opening, and secured to the bottom of the hopper in any suitable manner, is the corn-dropper and cut-off H. This cut-off and dropper comprises two guide-rails H' H', which are provided with screw-holes $h$, through which pass screws to fasten the device to the hopper.

The upper inner faces of the rails H' are provided with grooved recesses $h^2$, affording a seat and guideway for a plate H², which slides in said way flush with the upper surfaces of the rails. This plate is provided with an opening $e$. Secured on the under side of plate H² at its forward end is a block $h'$, and secured in said block is a depending staple $h^3$, to which is pivotally secured a rod $h^4$, which, in the operation of the device, causes the reciprocation of the parts of the corn-dropper, as will presently appear. About midway of the corn-dropper, and let into recesses in the bottom of the rails H', is a brace-bar H³, which also acts as a stop to limit the movements of the parts and to support the grains of corn before they are dropped to the ground. Situated on the bottom inner sides of the rails H' and extending rearward from the bar H³ are guide-supports $h^5$, and sliding thereon and supported thereby and by the bar H³ is a slide-block H⁴, preferably rectangular in contour, and having an aperture $h^6$, and on its under side, near its rear end, a stop-piece $h^7$. Secured at one end to the rear of the block H⁴, and curved upward to have its other end secured to the rear of the hopper B, is a leaf-spring S, which tends normally to press said block forward. Fastened to the block H⁴, and extending forward therefrom, is a rod R, having at its free end a projection $r$. This rod is adapted to slide freely through a staple, or other securing means $s$, on the block $h'$ and to have its projection $r$ engaged by the front end of the block in the forward movement of the parts.

P indicates a spout, which is divided into two compartments $p\ p'$ by a transverse partition $p^2$, into the forward compartment of which a chute Q leads from the frame C. A chute Q' leads from the corn-dropper into the rear compartment. The spout P is secured to the framework in any suitable manner, and its discharge end is located between the two arms $v\ v'$ of the runner V. Near the bottom of the compartment $p'$, or the one through which the corn drops, is pivotally secured a valve $p^8$, which is alternately opened and closed by means of a rod $p^3$, operated by a bell-crank lever $p^4$, which in turn is operated by a rod $p^5$.

Extending transversely across the machine and pivotally secured in suitable bearings on the framework are rods T T', and firmly secured thereon are upward-extending bifurcated fingers $t\ t'$, respectively. Keyed on the rod T' is a short crank-arm $p^6$, to which the rod $p^5$ is pivotally secured. On the rod T is keyed a short crank-arm $t^2$, to which is pivotally connected the bar G for operating the fertilizer cut-off. Keyed on the rod T' is a similar crank-arm $t^3$, to which is pivotally secured the bar $h^4$, which operates the corn-dropper.

First premising that this machine is intended to be used in connection with the ordinary button-chain, (indicated at Y,) and that the mechanisms described are operated by means of the buttons contacting with the fingers $t\ t'$ to rock, in turn, the rods T T', and that when the fingers are freed from the buttons the rods are returned to their normal position by means of suitable springs, such as indicated at $t^4\ t^5$, I will now give a general description of the operation of my device.

The hopper A is filled with fertilizer, which is supported on the plate E, and the hopper B with corn. The button-rope being placed in the bifurcations of the fingers $t\ t'$, the machine is started. The finger $t$ is first operated by a button to rock the rod T and thereby move the rod G and yoke D in a backward direction. This causes the plate F to pass beneath the opening $a^6$ in the hopper A to arrest the fall of the fertilizer, while the plate E is withdrawn from the frame C and the fertilizer thereon pushed off by contact with the side $c'$, whence it falls through the chute Q and forward compartment $p$ of the spout P to the ground. As the machine continues its forward movement, the button slips out of engagement with the finger $t$, and the spring $t^4$ returns the parts to their normal positions, withdrawing the plate F from the frame C and causing the plate E to re-enter it to receive the falling fertilizer. The button next comes in contact with the finger $t'$, which causes the rod T' to be rocked and thereby move the bar $h^4$ in a backward direction. At the time the button reaches the finger $t'$ the corn-dropping mechanism is in the position shown in Fig. 9. The opening $e$ in the plate $H^2$ registering in this position with the opening $b^6$ in the hopper, the corn falls through said openings and rests on the support $H^3$. As the bar $h^4$ is moved backward, the block $h'$, to which it is attached, moves the plate or cut-off $H^2$ backward, so that the openings $e$ and $b^6$ no longer register and the supply of corn is cut off. The block $h'$ now comes in contact with the slide-block $H^4$ and moves it backward on the guide-supports $h^5$ against the resistance of the spring S until the parts assume the position shown in Figs. 7 and 8, or, in other words, until the opening $h^6$ clears the support $H^3$, when the corn contained in said opening drops into the chute Q' and into the rear compartment $p'$ of the spout P and rests on the valve $p^8$. Coincident with the last-described operation, the rod T' also rocks the crank-arm $p^6$, which, through the medium of the rod $p^5$, bell-crank lever $p^4$, and rod $p^3$ causes the valve $p^8$ to open and drop the corn contained thereon to the ground. The dropping of the corn is practically coincident with the fall of the fertilizer, but it is sufficiently delayed to insure of the corn falling in the fertilizer.

It will be understood that the desired number of grains of corn are always resting on the blade of the valve $p^8$, and after the latter has opened and allowed these grains to fall it is closed again by the retraction of the spring $t^5$ in time to receive the grains falling from the chute Q'. As the button leaves the finger $t'$, the spring $t^5$ operates to return the parts to their normal position. In this operation the plate $H^2$ and block $H^4$ move in unison, the former through the retraction of bar $h^4$ and the latter through the pressure of spring S, until the stop $h^7$ strikes the support $H^3$, when the forward movement of block $H^4$ is arrested. At this point the opening $h^6$ is directly under the opening $b^6$, but communication between them is closed. The plate $H^2$ is still further drawn forward until the parts assume the position shown in Fig. 7. Should the spring S break, or from any cause fail to operate, the block $h'$, contacting with the projection $r$ on the rod R, will cause the block $H^4$ to be drawn back to its proper position.

In the forward movement of the machine the revolutions of the wheels, through the mechanisms previously described, will operate the agitators $q\,q'$ in the well-known manner, and cause the corn and fertilizer, respectively, to be fed to their delivering apparatus.

Referring to Fig. 5, it will be readily seen that by inserting the rod $d^5$ in either set of holes $d^4$ and the plate E in the corresponding openings $b^2\,c^2$ the amount of fertilizer to be dropped can be regulated to suit the requirements of the soil.

So far as I am aware, it has been the general practice in corn-planters to drop the corn and fertilizer through the same spout. Where this is done, it is found that the fertilizer will in time clog the corn-dropping mechanism and materially interfere with the working of the machine. This objection I overcome by keeping the corn and fertilizer entirely separate until they reach the ground.

It will also be seen that by the arrangement I have described the corn and fertilizer will always reach the ground at approximately the same time irrespective of the speed of the machine.

Having thus fully described my invention, what I claim as new, and desire to secure by Letters Patent, is—

1. In a corn-planter and fertilizer-distributer, a cut-off and measurer comprising a measuring-chamber having a plurality of slits or openings in opposite sides thereof, a pair of oppositely-arranged cut-off plates adapted to slide in said openings, and means for reciprocating the said plates.

2. In a corn-planter and fertilizer-distributer, a cut-off and measurer comprising a measuring-chamber having a plurality of slits or openings in opposite sides thereof, in alignment with each other, a pair of oppositely-arranged cut-off plates adapted to slide through said openings at different heights, respectively, and means for reciprocating the said plates.

3. In a corn-planter and fertilizer-distributer, in combination with a hopper, a cut-off and measurer comprising a measuring-chamber having a series of slits or openings in opposite sides thereof, a pair of oppositely-arranged cut-off plates adapted to slide in said openings, one of said plates being adapted to be inserted in any pair of the series of openings, whereby to increase or diminish the carrying capacity of the said chamber.

4. In a corn-planter and fertilizer-distributer a cut-off and measurer comprising a measuring-chamber having a series of slits or openings in opposite sides thereof, a yoke supported in bearings on said chamber and carrying a pair of oppositely-arranged cut-off plates adapted to slide through said openings, one of said plates being stationary with regard to the yoke and the other being adjustable thereon, and means for reciprocating the yoke.

5. In a corn-planter and fertilizer-distributer, a cut-off and measurer comprising a measuring-chamber having a series of slits or openings in opposite sides thereof; a yoke supported in bearings on said chamber and carrying a pair of oppositely-arranged cut-off plates adapted to slide through said openings, one of said plates being adjustable, lugs depending from said yoke and having a series of holes therein in alignment with each other, a bolt adapted to rest in said holes and carrying the adjustable plate, and means for reciprocating the yoke.

6. In a corn-planter and fertilizer-distributer, a corn-dropper comprising, in combination with the hopper, a slide-block having a corn-receptacle, a cut-off plate coacting therewith and with the hopper, and means for reciprocating said block and plate.

7. In a corn-planter and fertilizer-distributer, a corn-dropper comprising, in combination with the hopper, a slide-block having a corn-receptacle, a grain-supporting plate, a cut-off plate having an opening, located between the slide-block and hopper, and means for reciprocating first the cut-off plate and then the slide-block.

8. In a corn-planter and fertilizer-distributer, a corn-dropper comprising, in combination with the hopper, a slide-block having an opening, guideways beneath the hopper on which said block bears, a cut-off plate having an opening, and supported on said block and adapted to slide between it and the hopper, and means for reciprocating first the cut-off plate and then the slide-block whereby to bring the opening in the slide-block and in the cut-off plate alternately into register with the discharge-mouth of the hopper.

9. In a corn-planter and fertilizer-distributer, a corn-dropper comprising, in combination with the hopper, a slide-block having a corn-receptacle, means for automatically projecting the block into register with the discharge-opening of the hopper, a cut-off plate coacting with the said block and with the hopper, and means for reciprocating said block and plate.

10. In a corn-planter and fertilizer-distributer, a corn-dropper comprising, in combination with a hopper, a combined cut-off plate and slide-block, means for reciprocating the same in unison, and a stop for arresting the motion of the slide-block in advance of the stoppage of the cut-off plate.

11. In a corn-planter and fertilizer-distributer, a corn-dropper comprising, in combination with a hopper, a cut-off plate carrying a block, $h'$, means for reciprocating the said plate, and a slide-block located beneath the plate and adapted to be projected by the block, $h'$.

12. In a corn-dropper and fertilizer-distributer, a corn-dropper comprising, in combination with a hopper, a cut-off plate having a block, $h'$, means for reciprocating said plate, a slide-block located beneath the plate and adapted to be projected by the block, $h'$, and means for imparting a retrograde movement to the slide-block.

13. In a corn-planter and fertilizer-distributer, a corn-dropper comprising, in combination with a hopper, a slide-block and a cut-off plate having each an opening adapted normally to register with the discharge-opening of the hopper, a grain-support, $H^3$, positioned normally to prevent discharge from said openings, and reciprocating mechanism for projecting first the cut-off plate, whereby to stop the flow of grain, and then the slide-block whereby to clear it of the said grain-support, substantially as described.

14. In a corn-planter and fertilizer-distributer, a fertilizer-hopper and grain-hopper, a spout through which the fertilizer is discharged directly to the ground, a valve in the spout onto which the grain falls, and means for operating the valve to permit a droppage of the grain supported thereon coincident with the discharge of the fertilizer.

15. In a corn-planter and fertilizer-distributer, a fertilizer-hopper and grain-hopper, a spout located below the fertilizer-chamber and having a partition forming two compartments, one of which is in communication with the fertilizer-hopper, a valve in the other compartment, a chute connecting the grain-hopper with the latter compartment, and means for operating the valve whereby to cause it to drop the grain coincident with the discharge of the fertilizer.

In testimony whereof I affix my signature in presence of two witnesses.

RICHARD W. JONES.

Witnesses:
ALFRED C. LOUD,
PHILIP G. WILMER.